United States Patent [19]

Hulbert

[11] Patent Number: 5,717,723
[45] Date of Patent: Feb. 10, 1998

[54] APPARATUS FOR USE IN EQUIPMENT PROVIDING A DIGITAL RADIO LINK BETWEEN A FIXED RADIO UNIT AND A MOBILE RADIO UNIT

[75] Inventor: Anthony Peter Hulbert, Shirley, England

[73] Assignee: Roke Manor Research Limited, Hampshire, England

[21] Appl. No.: 292,105

[22] Filed: Aug. 17, 1994

[51] Int. Cl.⁶ .................................................. H04L 27/06
[52] U.S. Cl. ........................................ 375/340; 371/53
[58] Field of Search ................................ 375/340, 346, 375/316, 325, 324; 371/37.1, 37.2, 37.5, 37.6, 37.853, 54, 20.1, 48

[56] References Cited

U.S. PATENT DOCUMENTS

| | | | |
|---|---|---|---|
| 4,710,960 | 12/1987 | Sato | 381/47 |
| 4,763,331 | 8/1988 | Matsumoto | 371/37 |
| 5,010,554 | 4/1991 | Bechtel et al. | 371/37.1 |
| 5,027,374 | 6/1991 | Rossman | 371/43 |
| 5,073,940 | 12/1991 | Zinser et al. | 381/47 |
| 5,111,483 | 5/1992 | Serfaty | 375/340 |
| 5,150,369 | 9/1992 | Costa | 37/43 |

FOREIGN PATENT DOCUMENTS

| | | |
|---|---|---|
| 2189669 | 10/1987 | United Kingdom . |
| 2238692 | 6/1991 | United Kingdom . |
| 2238933 | 6/1991 | United Kingdom . |
| 2246272 | 1/1992 | United Kingdom . |
| 2253123 | 8/1992 | United Kingdom . |

*Primary Examiner*—Tesfaldet Bocure
*Assistant Examiner*—Bryan Webster
*Attorney, Agent, or Firm*—Hill, Steadman & Simpson

[57] ABSTRACT

Modulation schemes requiting fully coherent demodulation usually include some form of known transmission or pilot transmission to resolve the phase ambiguity which would be inevitable in any form of demodulation which relies on the data transmission allowed for demodulation. When the transmission of phase shift keying information is used without any pilot component and use of decision directed carrier recovery for demodulation is supplied, then error control coding may be used to resolve the inherent phase ambiguities. The source data is augmented with a suitable checksum, i.e. one that does not show correct data for all bits inverted prior to protection with a forward error correction code and modulation. The demodulated data is error corrected and the checksum tried. If this checks out then the data is accepted as correct. Otherwise the demodulated data is inverted and the process repeated. If this fails, blocks of demodulated data may be inverted around points corresponding to troughs in the energy of the decision derived reference. The technique allows coherent demodulation of phase shift keying without any pilot transmission resulting in very good signal to noise ratio performance.

9 Claims, 5 Drawing Sheets

1

APPARATUS FOR USE IN EQUIPMENT PROVIDING A DIGITAL RADIO LINK BETWEEN A FIXED RADIO UNIT AND A MOBILE RADIO UNIT

BACKGROUND OF THE INVENTION

1. Field of the Invention

The present invention relates generally to radio links and more specifically to an apparatus for use in equipment providing a digital radio link between a fixed radio unit and a mobile radio unit.

2. Description of the Related Art

Equipment for providing such a radio link is described in Great Britain Patent Application No. 9304901.3. This application describes the use of Wiener-like filters for providing good estimates of the amplitude of the in phase I and the quadrature phase Q components of, for example, a spread spectrum pilot signal.

In general, modulation schemes requiring fully coherent demodulation must include some form of known transmission or a pilot transmission. This is due to the phase ambiguity which is inevitable in any form of demodulation which relies on the dam transmission alone for demodulation. In such schemes, the pilot content of the transmitted signal includes a certain amount of additional energy.

SUMMARY OF THE INVENTION

It is an object of the present invention to provide an apparatus providing a digital radio link between a fixed and a mobile radio unit in which the additional energy included in the pilot content of a transmitted signal is reduced to a minimum.

The present invention provides an apparatus for use in equipment providing a digital radio link between a fixed radio unit and a mobile radio unit. The apparatus has means for receiving an input signal, means for decoding the data and computing the overall reliability metric for correct detection of a frame of dam in the input signal for each possible set of inverted dam, comparison means for comparing the metrics for each inversion and selection means for selecting the highest metric.

Embodiments of the present invention will now be described with reference to the accompanying drawings.

DETAILED DESCRIPTION OF THE PREFERRED EMBODIMENTS

The present invention uses the redundant information included in error control coding to resolve any phase ambiguities. A binary phase shift keying signal is transmitted which may be a differential binary phase shift keying signal. The signal may be demodulated using either of the demodulators shown in FIGS. 1 and 2.

Figure 2:
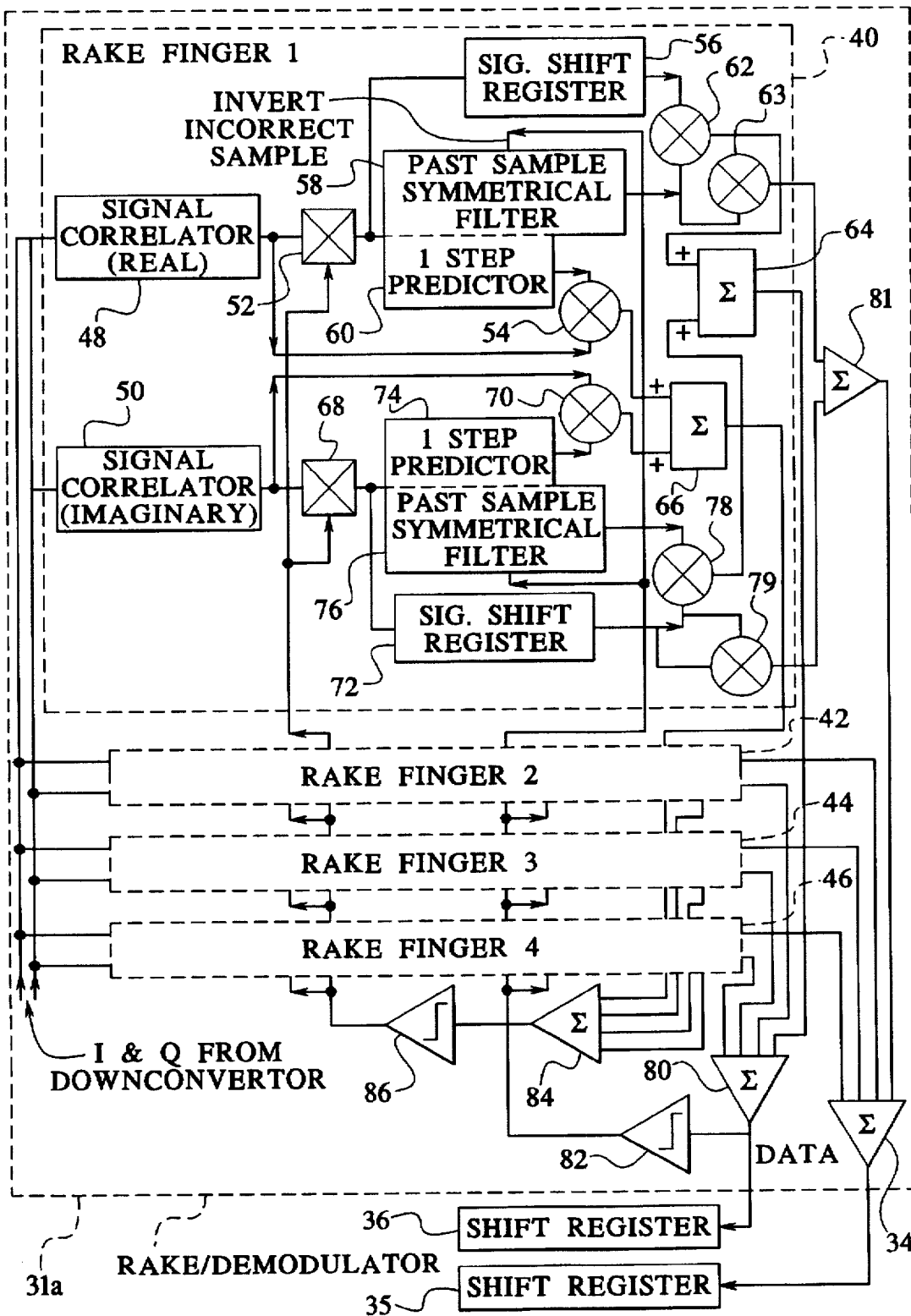
FIG. 2 is a receiver having a double-pass decision direct demodulator.

Referring now to FIG. 2, a plurality of Rake fingers 40, 42, 44, 46, are shown each having the following circuit elements. Each Rake finger includes a first signal correlator 48 which handles the in phase I components of the input signal, and a further signal correlator 50 which handles the quadrature components Q of the input signal. The input signal is received from a down converter. The correlator 48 is connected to an input of a half linear multiplier 52 and to a first input of a linear multiplier 54. An output from the half linear multiplier 52 is connected to a signal shift register 56 and to a past sample symmetrical filter 58 and to a one step predictor 60. An output from the signal shift register 56 and the past sample symmetrical filter 58 is connected to an input of a further linear multiplier 62, respectively. An output from the one step predictor 60 is connected to a second input of the linear multiplier 54. An output from the linear multiplier 62 is connected to a first adder circuit 64. An output from the linear multiplier 54 is connected to an input of a second adder circuit 66.

An output from the signal correlator 50 is connected to an input of a further half linear multiplier 68 and to a first input of a linear multiplier 70. An output from the half linear multiplier 68 is connected to an input of a signal shift register 72, an input of a one step predictor 74, and to an input of a further past sample symmetrical filter 76. An output from the signal shift register 72 and an output from the past sample symmetrical filter 76 is connected to an input of a linear multiplier 78, respectively. An output from the one step predictor 74 is connected to a second input of the linear multiplier 70. An output from the linear multiplier 70 is connected to a second input of the adder circuit 66, and the output from the linear multiplier 78 is connected to a second input of the adder circuit 64. An output from the adder circuit 64 is connected to a further adder circuit 80 which receives the corresponding outputs from the other Rake fingers and generates a data signal at an output thereof. The output from the adder circuit 80 is also connected to a hard limiting device 82 which has its output fed back to an input of the past sample symmetrical filters in each Rake finger. The output from the adder circuit 66 is connected to an input of a further adder circuit 84 which receives the corresponding outputs from the other Rake fingers. The output from the adder circuit 84 is connected to a further limiting circuit 86. An output thereof is connected to a further input of each of the half linear multipliers 52, 68 in each Rake finger. Elements 63, 79 and 81 correspond to elements 31, 32 and 33 in FIG. 1. Also shown in FIGS. 1–5 is the combined rake/demodulator 31a.

The circuit diagrams described above may be used to perform the present invention. Their operation is described in Great Britain Patent Application No. 9304901.3 with respect to FIG. 1 and Great Britain Patent Application No. 9309748.3 with respect to FIG. 2.

The demodulated data may all be inverted, or part of it may be inverted. In general, the sense of the carrier reference is arbitrary, so assuming that there is no inversion contained within a signal burst, there is a 50% probability of demodulating the data inverted. If, during a transmission frame, there is a deep fade involving all of the Rake fingers, then the decision directed pilot may become lost during this fade. When the reference is newly obtained as the signal emerges from fade, it will have a 50% probability of having the opposite sense to that before the fade. However, it is highly improbable that a reference inversion will occur other than at or near the time of such a fade. Thus, if the deepest fades can be identified then the places of possible data inversion can also be defined.

To achieve this, the signal fading can be found from the channel estimates either from the one step predictor 60 or from the past sample symmetrical filter 58 as discussed above. A profile of the signal energy over a transmit frame can be obtained by squaring and adding together the outputs from the one step predictors or from the past sample symmetrical filters.

The most likely choice of inversion or non-inversion of either the whole or parts of a frame can be determined from either forward error correction coding (FEC) and error detection checksum (EDC) or ideally a combination of the two. This is achieved as follows.

When only forward error correction coding is used, then for each of the possible set of inversions, the data is decoded and the overall reliability metric for the correct detection of the frame is computed. This will generally either be, or closely related to, the a posteriori probability for that decoded data sequence. For example, in the case of convolutional encoding, it would simply be the path metric corresponding to the final selected path. For every choice of inversion the metrics are compared, and a selection is made of those comparisons which yield the highest metric. Codes for which the compliments of codewords are also codewords may not be used, for example cyclic codes.

When using error detection checksum, the data is demodulated and the checksum is applied. If it is correct then the data is accepted. If not, then the data is inverted and the checksum applied again. If correct the process ceases, otherwise the data on one side of the point of minimum total estimated signal over the fade is inverted and the process if repeated. If this fails the whole burst is inverted and so on, working through the places of minimum signal until the checksum succeeds. Again, codes with compliments of codewords as codewords may not be used. This restriction may be removed if one bit of known data is added to the source data prior to encoding. If that bit is inverted then clearly the data is incorrect. This approach may be liable to random errors, and therefore is best used in combination with the forward error correction coding.

When combining forward error correction coding with error detection checksum both the forward error correction coding and the error detection checksum are applied. If correct the process stops, otherwise a procedure is continued as described for the above case of error detection coding until successful decoding is obtained.

When selecting the points of possible inversion it is necessary to separate the fades. It is undesirable to identify a large number of closely spaced points all essentially at or near the bottom of the same fade. This is achieved by using the fact that the separation of fades would be related to the correlation time of the channel for the prevailing fading conditions, i.e. vehicle speed, etc. An estimate of the correlation time is therefore needed. An approximate value of this may be obtained by examining which of the estimation filter types are in use.

The fades are identified by the following algorithm.
1) Identify the point with the smallest signal level over the available frame.
2) If this is more than n (where n is a small number) bits from either edge of the frame, add this to a list of fades.
3) Remove (or set to an arbitrary high signal level) all of the points surrounding the last smallest signal level point (whether or not used in step 2) to a distance of $\pm x$ times the correlation time (or out to the edge of the frame if this is less far in one direction).
4) Repeat from step 1 until all necessary points have been identified.
5) When all points have been identified, reverse the order of the list to obtain a list in descending order of significance. The deepest fade will therefore be the most likely position for a reference inversion.

Step 2 described above is applied because fading on either side or both edges of the frame is covered by the initial inversion.

The value of n would be zero if the channel estimate were noise-free. In practice, n is set to a small number to allow for the possibility that the lowest signal level is at the edge of the frame, but that noise has disguised the fact. Moreover, if the deepest fade is only a few bits from the edge of the frame, then only these few bits will be affected and these could be corrected by the forward error correction procedure.

The factor x in step 3 must be set empirically to a value optimal for the range of possible correlation times applied by the choice of Wiener filter.

Referring back to FIG. 1, which represents a conventional decision directed channel estimating demodulator for DPSK, the demodulator is modified by the linear multipliers 31, 32 and the adder circuit 33, which for each Rake finger together has a signal energy estimator and the shift registers 35, 36. The estimates are combined across the Rake fingers in the adder circuit 34 to produce an overall estimate of the receive energy at any given point. This received estimate is accumulated in a shift register 35. The shift register 35 at the end of a transmit frame will contain a profile of the signal energy over the duration of the transmission of that frame.

Figure 1:
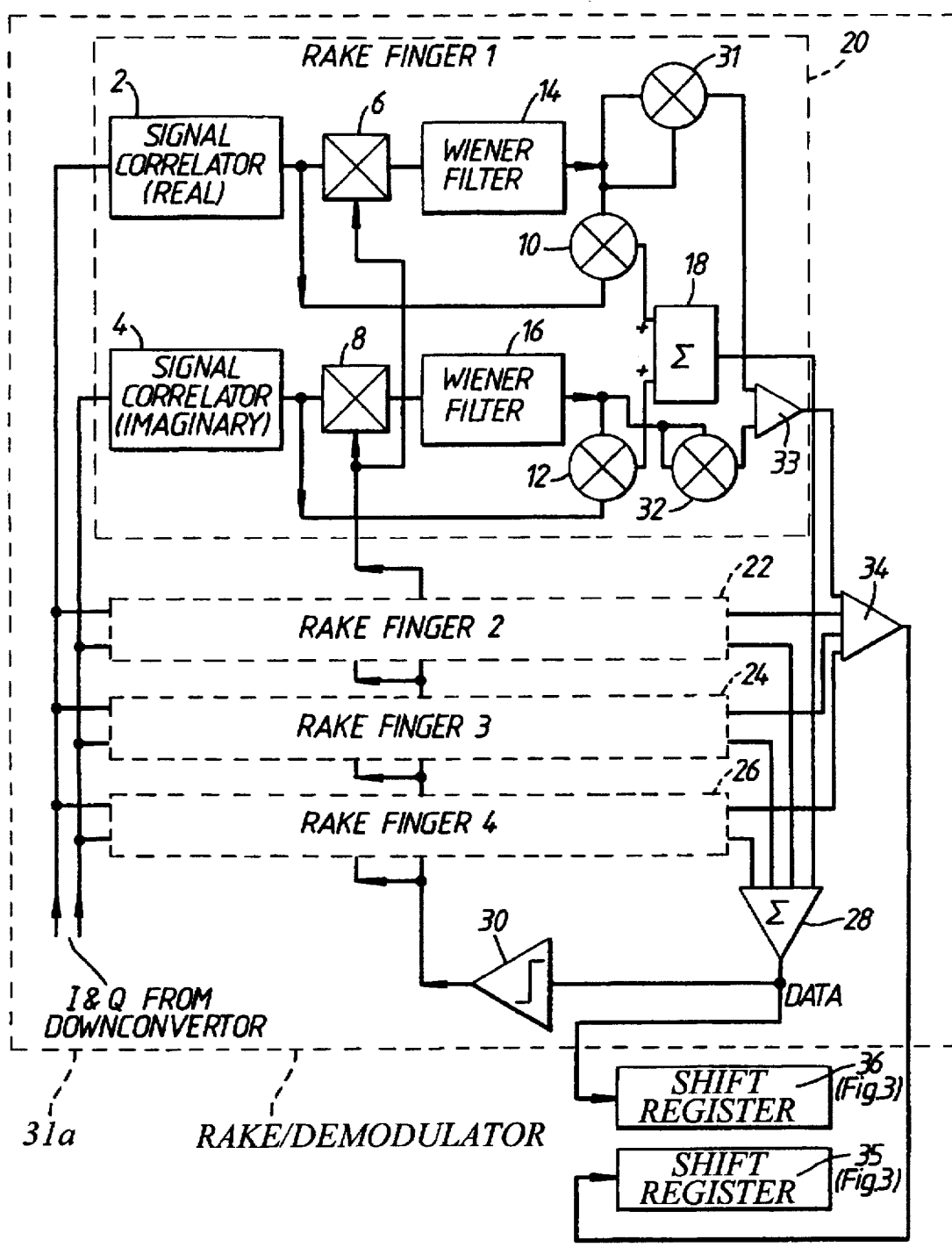
FIG. 1 is a block diagram of a differential binary phase shift keying receiver using decision directed Wiener filter de-modulation.
Figure 3:
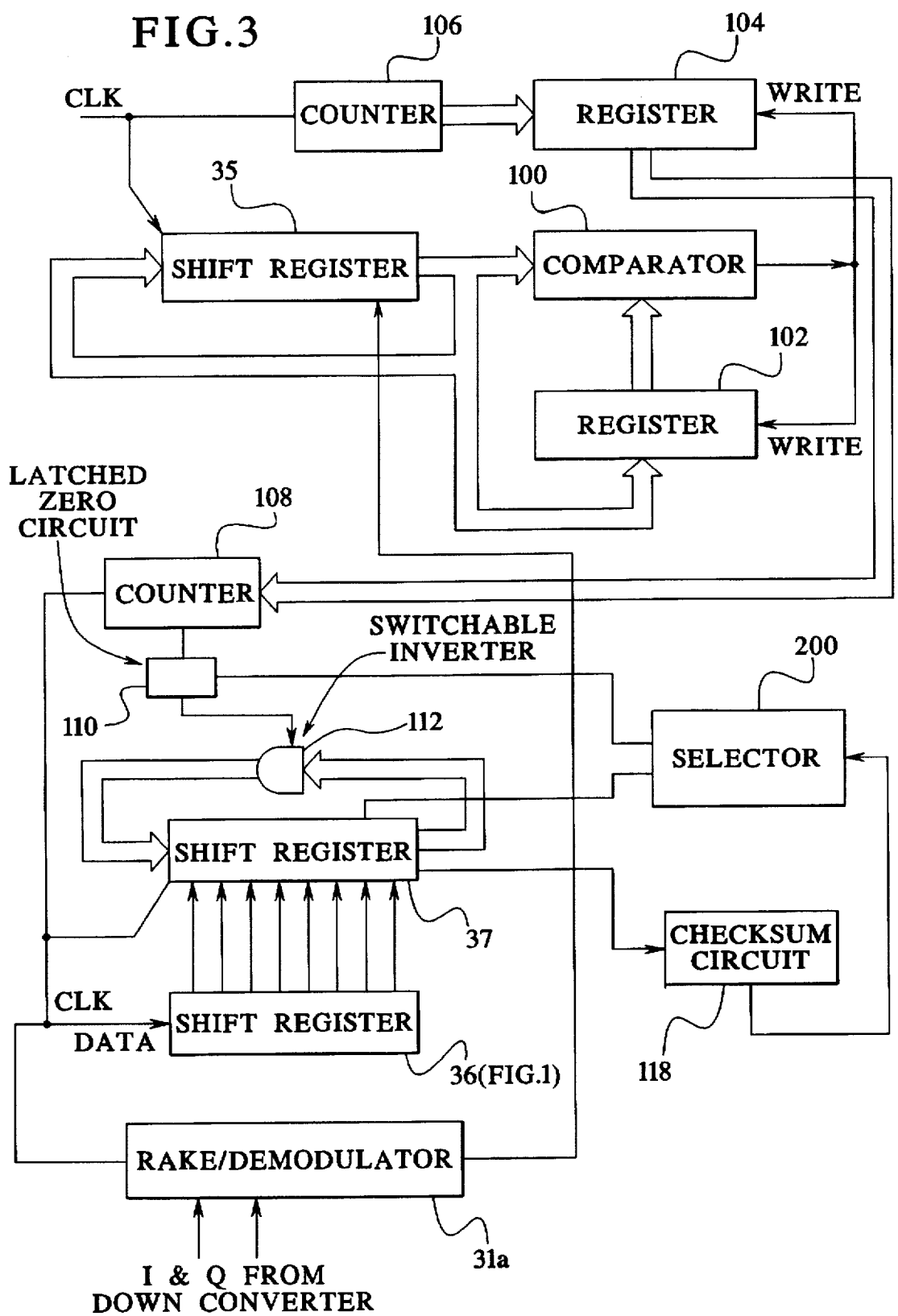
FIG. 3 is a block diagram of the circuitry of the present invention which may be used to fulfill the objects of the invention in association with FIG. 1 or FIG. 2.

Referring to FIG. 3, the circuitry which carries out the present invention comprises the shift register 35 which is connected to receive the output from the adder circuit 34 of FIG. 1. The shift register has its output looped around to an input, and the output is also connected to an input of a comparator 100 and to a register 102. A counter 106 has an output connected to an input of a register 104, and the output from the register 104 is connected to an input of a further counter 108. The output from the register 102 is connected to a further input of the comparator 100, and the output of the comparator 100, which represents a write signal is applied to a write input of the registers 102 and 104. An output from the counter 108 is applied to an output of a zero latch circuit which is connected to control a switchable invertor 112. The invertor 112 is connected in a loop around path of the shift register 37. The shift register 37 is connected to be loaded from the shift register 36 shown in FIG. 1. An output from the shift register 37 is connected to an input of a de-interleaving circuit 114, an output of which is connected to a viterbi decoder 116. An output from the decoder 116 is connected to an input of a checksum circuit 118.

The counter 106, counter 108 and shift registers 35, 37 are connected to receive a clock input signal which is initialized from, for example, the circuitry of FIG. 1.

An object of the invention is to search the profile for minima. FIG. 3 depicts one implementation of a preferred embodiment of the invention and shows digital hardware means whereby the location of minimum energy within a signal can be determined. The circuit operates as follows.

As illustrated in FIG. 3, the shift register 35 is initialized by the demodulator and contains the stored profile of the signal energy. The shift register 35 is connected in a looped around feedback circuit and is clocked so that successive contents of the shift register are cycled around. As the shift register 35 is clocked, its output is fed to a comparator circuit 100, and the other input of the comparator is connected to a register 102 which is initialized to contain an arbitrarily high value. As the contents of shift register 35 are cycled around the comparator 100, the output will vary depending upon whether its input from the shift register 35 is grater or less than its input from register 102. Whenever the input from shift register 35 is less, the output of the comparator circuit 100 will go high and will drive the write input of register 102 high to enable the contents of that register to be overwritten with the output of shift register 35. In this way as the contents of shift register 35 are cycled, the register 102 will always contain the smallest value encountered so far. In parallel with this operation, a counter 106 is clocked to count the number of rotations of the shift register 35. Whenever the output of comparator circuit 100 goes high the contents of this counter are written into another register 104. When all cycles of the shift register 35 have been completed, the register 104 will contain the contents of the shift register 35 which corresponds to the position of the smallest entry.

The contents of the register 104 are used to shift a copy of the phase compensated demodulated data in the manner described as follows. In a similar way to shift register 35, a shift register 37 contains a copy of the contents of shift register 36 which is connected to the data output line of FIG. 1. The shift register 37 is clocked cyclically and includes a feedback path which contains a switchable invertor 112. A counter circuit 108 which counts down is initialized with the contents of register 104, and thus as it counts down, it counts down to zero at the shift corresponding to the position of the minimum energy. At this point it generates an output through a latched zero circuit 110 which controls the switchable invertor 112 in such a way that following this shift all other data is copied back into the shift register 37 inverted. Thus, following the complete rotations of the shift register, part of the data will be inverted with respect to the remainder. Following this operation the output of shift register 37 is clocked out to a de-interleaving circuit 114. The output of the de-interleaving circuit 114 is applied to a viterbi decoder 116 and a checksum is performed by circuit 110. If the checksum gives correct data, then no further operations are required. Otherwise, the contents of shift register 37 are inverted and applied to the deinterleaver, and the process is repeated.

It will be appreciated by those skilled in the art that the embodiment described with reference to FIG. 3 in association with the demodulator shown in FIG. 1 may also be used in association with the demodulator shown in FIG. 2.

Figure 4:
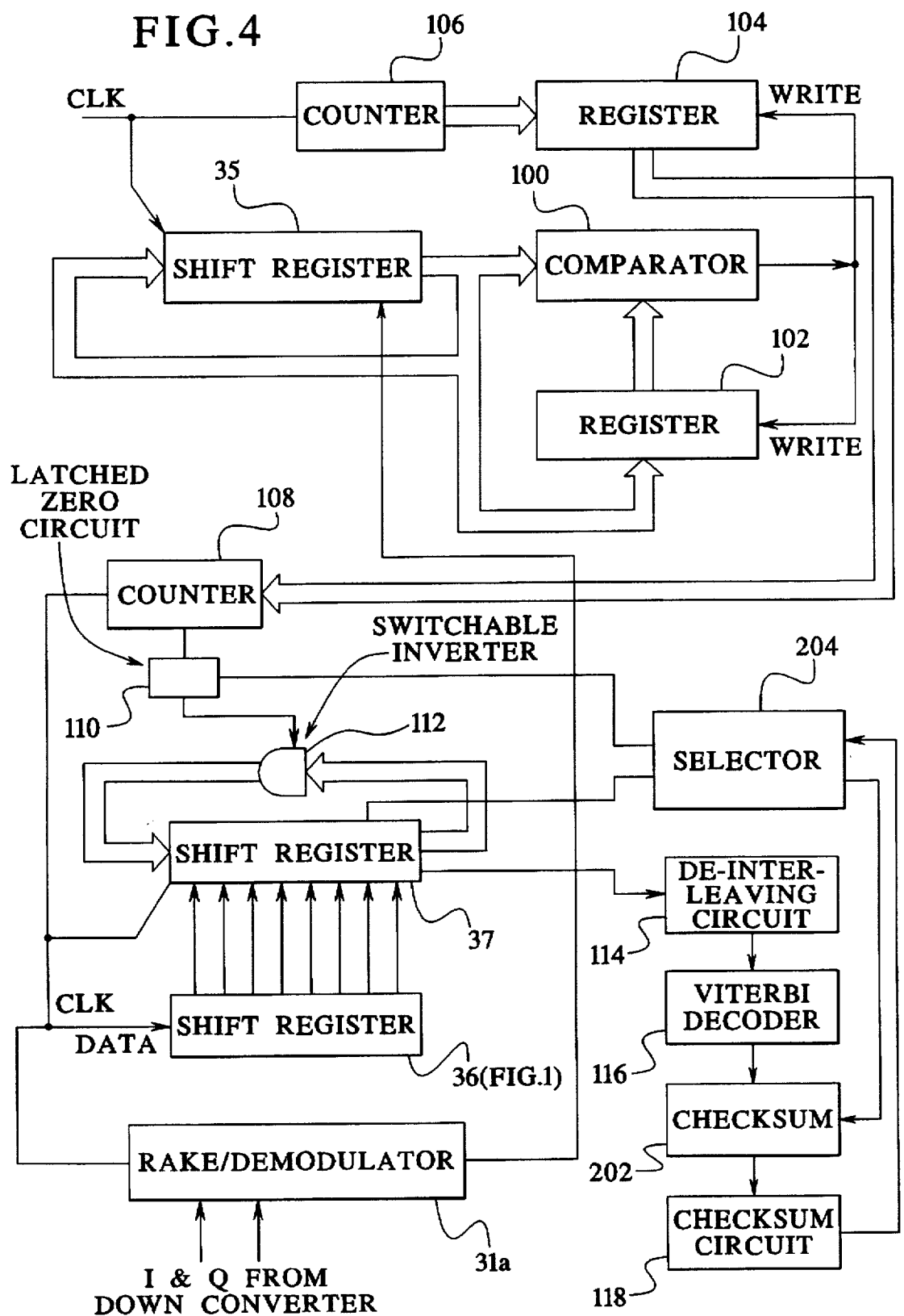
FIG. 4 depicts an alternative embodiment of the FIG. 3 embodiment.

In FIG. 4, element 202 has been added between elements 116 and 118. Also element 204 has been added. Elements 202 and 204 form the selection means for selecting a first set of inverted data corresponding to a highest of the metrics.

Figure 5:
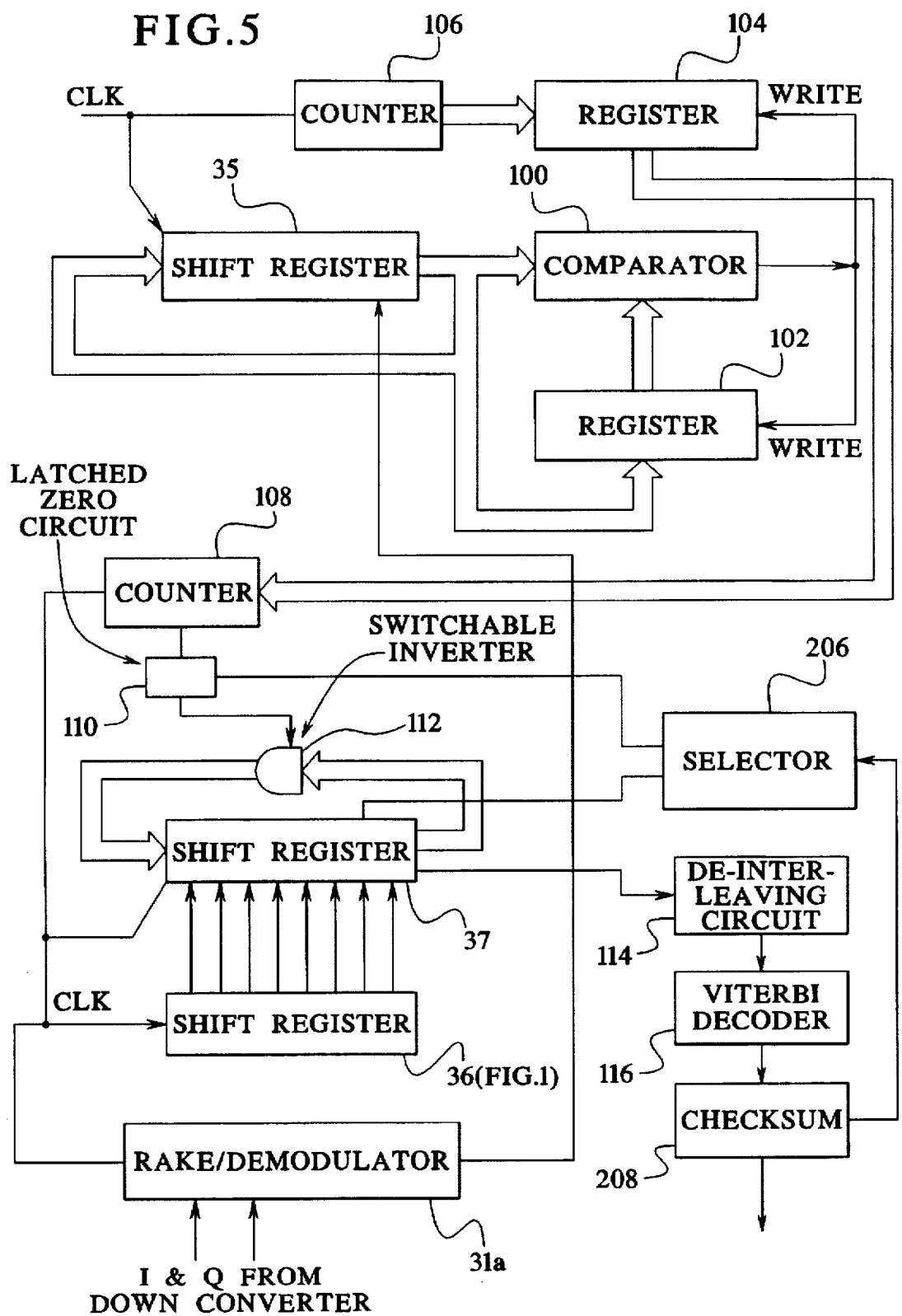
FIG. 5 depicts an alternative embodiment of the FIG. 3 embodiment.

In FIG. 5, element 206 controls generation of each data set corresponding to possible inversion of the demodulated data. Element 208 stores and arranges each set of decoded data frames in an order corresponding to descending metric value. A decoded data frame with an associated highest metric is selected by the control means 206 and is then output.

Although the invention has been described with respect to preferred embodiments, it is not to be so limited as changes and modifications can be made therein which are within the full intended scope as defined by the appended claims.

I claim:

1. Apparatus for use in equipment providing a digital radio link between a fixed radio unit and a mobile radio unit, said apparatus comprising:

means for receiving an input signal containing data and for demodulating said input signal;

means for applying a checksum to said demodulated signal;

means for ascertaining whether data of said demodulated signal corresponds with said checksum; and means for inverting said data of the demodulated signal on one side of a point of minimum total estimated signal over a fade and re-applying said checksum if said data does not correspond with said checksum and means for re-applying said checksum.

2. Apparatus as claimed in claim 1, wherein said means for inverting said data is means for inverting said data for each location of minimum signal until said checksum corresponds thereto.

3. Apparatus for use in equipment providing a digital radio link between a fixed and a mobile radio unit, said apparatus comprising:

means for receiving an input signal containing data and for demodulating said input signal;

means for computing an overall reliability metric for correct detection of a frame of said data in said demodulated signal for a possible set of inverted data;

comparison means for comparing metrics of each said set of inverted data;

selection means for selecting a first set of inverted data corresponding to a highest of said metrics;

means for applying a checksum to said first set of inverted data;

means for ascertaining whether data of said first set of inverted data corresponds to said checksum; and means for selecting an alternative set of inverted data and reapplying said checksum if said first set of data does not correspond to said checksum.

4. Apparatus as claimed in claim 3, further comprising means for identifying signal fades having:

means for identifying a point with a smallest signal level over an available frame;

means for adding said point to a list of fades if said point is more than n (where n is a small number) bits from an edge of said frame;

means for removing all points surrounding a last smallest signal level to a distance of +/−x times a correlation time; and means for reversing an order of said list to obtain a list in descending order of significance when all points have been obtained.

5. Apparatus as claimed in claim 4, wherein said means for removing all points surrounding a last smallest signal level to a distance of +/−x times a correlation time is further defined by means for setting said factor x empirically to a value optimal for a range of possible correlation times implied by a choice of Wiener filter used.

6. A method for minimizing additional energy in a pilot of a transmitted signal in an apparatus for use in equipment providing a digital radio link between a fixed and a mobile radio unit, said method comprising the steps of:

receiving an input signal having data and demodulating said input signal;

applying a checksum to said demodulated signal;

ascertaining whether data of said demodulated signal corresponds with said checksum; and inverting said data of the demodulated signal on one side of a point of minimum total estimated signal over a fade and reapplying said checksum if said data does not correspond with said checksum.

7. A method for minimizing additional energy in a pilot of a transmitted signal in an apparatus for use in equipment providing a digital radio link between a fixed and a mobile radio unit according to claim 6, wherein said step of inverting said data on one side of the point of minimum total estimated signal over a fade and reapplying said checksum is further defined by inverting a data burst for each place of minimum signal until said checksum corresponds when said data is not accepted.

8. A method for minimizing additional energy in a pilot of a transmitted signal in an apparatus for use in equipment providing a digital radio link between a fixed and a mobile radio unit, said method comprising the steps of:

identifying a point having a smallest signal level over an available frame;

adding said point to a list of fades if said smallest signal level is more than n bits from an edge of said frame;

removing all points surrounding said smallest signal level to a distance ±x times a correlation time;

repeating said step of identifying a point with said smallest signal level over an available frame until all necessary points have been identified; and reversing the order of said list to obtain a list in descending order of significance when all points have been obtained.

9. A method for minimizing additional energy in a pilot of a transmitted signal in an apparatus for use in equipment providing a digital radio link between a fixed and a mobile radio unit according to claim 8, wherein said step of removing all points surrounding said smallest signal level to a distance ±x times a correlation time is further defined by setting said factor x empirically to a value of optimal for a range of possible correlation times implied by a choice of Weiner filter used.

* * * * *